United States Patent [19]
Moriyasu

[11] Patent Number: 6,082,691
[45] Date of Patent: Jul. 4, 2000

[54] SHAFT ROTATOR

[75] Inventor: Yoshitada Moriyasu, Katano, Japan

[73] Assignee: Matsushita Electric Industrial Co., Ltd., Japan

[21] Appl. No.: 09/053,134

[22] Filed: Apr. 1, 1998

[30] Foreign Application Priority Data

Apr. 7, 1997 [JP] Japan ..................................... 9-087932

[51] Int. Cl.$^7$ .................................................. E04G 3/00
[52] U.S. Cl. ........................ 248/274.1; 396/422; 348/373
[58] Field of Search ............................. 248/274.1, 276.1,
248/279.1, 282.1, 289.11; 396/422; 358/909.1,
906; 348/373, 374, 375, 376

[56] References Cited

U.S. PATENT DOCUMENTS 5,738,321 4/1998 Moriyasu .

*Primary Examiner*—Timothy V. Eley
*Assistant Examiner*—Willie Berry, Jr.
*Attorney, Agent, or Firm*—Parkhurst & Wendel, L.L.P.

[57] ABSTRACT

A compact configuration of a video camera was conventionally hindered by a control mechanism which required a large space in a casing of a VTR unit. In the present invention, a reference numeral 6 represents a rotating shaft of a monitor screen unit (2), which passes through a holding member (8) and a open/close load member (10), and has a tip having a section in a D-like shape. A reference numeral 7 designates a fixed plate which is fixed to the monitor screen unit (2) and to which a rotating shaft (6) is fixed by caulking. A reference numeral 8 denotes the holding member, and a reference numeral 9 represents an open/close shaft which is fixed to a recorder/reproducer unit (1) with a screw, and passes through the holding member (8) and a carting portion of the open/close load member (10), and is forcibly fitted into the carting portion to produce a torque for rotating the holding member (8). An open/close shaft (9) has ends having an section in an oval shape, over which an open/close restricting plate (5) is forcibly fitted, and a side plate 4 is fitted over this open/close restricting plate from outside and fixed to the holding member (8) with a screw.

6 Claims, 7 Drawing Sheets

SHAFT ROTATOR

FIELD OF THE INVENTION

The present invention relates to a shaft rotator, and more specifically a shaft rotator which is useful for use in a hinge portion of a video camera which has a monitor screen unit freely rotating relative to a camera body.

BACKGROUND OF THE INVENTION

Currently a large number of video cameras which are equipped with monitor screen units configured as casings separate from video camera bodies (hereinafter referred to as VTR units are offered for sale). A video camera equipped with a monitor screen unit which can be positioned horizontal relative to a VTR unit, opens and closes to positions at which it is revolved substantially perpendicular to the VTR unit and rotates around an axis substantially perpendicular to the VTR unit has two rotating shafts which enable the respective rotations. When these two rotating shafts are rotated at the same time, however, a casing of the VTR unit may be brought into contact with an angle portion of the casing of the monitor screen unit, whereby either of the casings may be injured. Further, a video camera equipped with a shaft rotator which does not allow two shafts to be rotated at the same time adopts a rotating shaft control mechanism which occupies a large space in a casing of a VTR unit or an external equipment unit, thereby constituting a hindrance to a compact configuration of the video camera.

A configuration of the rotating shaft control mechanism of the conventional shaft rotator will be described below. Main members of the rotating shaft control mechanism of the conventional rotating shaft rotator are shown in an enlarged perspective view in FIGS. 6a and 6b, wherein a reference numeral 19 represents a first rotating support shaft which is fixed to a VTR unit 1, a reference numeral 20 designates a second rotating support shaft and a reference numeral 21 denotes a fixing plate which is fitted over the shafts and is freely rotatable. A rotating boss 14 is fixed to the fixing plate 21, a rotating shaft 15 passes through the rotating boss 14 in a freely rotatable condition, a monitor screen unit 2 is fixed to one end of the rotating shaft 15 and a rotation control piece 16 is fixed to the other end of the rotating shaft 15. Further, the rotation control piece 16 has a circle-like shape, from which two opposing portions of its contour are linearly cut off, and is equipped on both side faces thereof with a first rotation control plate 17 and a second rotation control plate 18 which are fixed to the VTR unit.

Now, description will be made of operations of the conventional shaft rotator which is configured as explained above.

First, the monitor screen unit 2 is revolved in a direction indicated by an arrow A around the first rotating support shaft 19 and the second rotating support shaft 20. At this time, the rotation control piece 16 which is fixed by way of the monitor screen unit 2 and the rotating shaft 15 is in a condition where it is not rotatable since its linearly cut portions are defined as side faces thereof and sandwiched between the first rotation control plate 17 and the second rotation control plate 18. As a result, the monitor screen unit 2 which is fixed by way of the rotating shaft 15 is also in a condition where it is not rotatable.

When the monitor screen unit 2 is further revolved in the direction indicated by the arrow A until the monitor screen unit is substantially perpendicular to the VTR unit 1 as shown in FIG. 6b, the rotation control piece 16 is set in a condition where it is rotatable in a direction indicated by an arrow B or C since it is positioned at a location where the first rotation control plate 17 and the second rotation control plate 18 are widened, and the monitor screen unit 2 which is fixed against rotation by way of the rotating shaft 15 is also set in a rotatable condition.

Even if it is attempted to rotate the monitor screen 2 in a direction reverse to that indicated by the arrow A while the monitor screen unit 2 is kept turned for about 90° in the direction indicated by the arrow B or C as shown in FIG. 7, arc portions of the rotation control piece 16 which is fixed by way of the monitor screen unit 2 and the rotating shaft 15 are located on sides of the first rotation control plate 17 and the second rotation control plate 18, and the rotation control piece 16 cannot penetrate into a location where the first rotation control plate 17 and the second rotation control plate 18 have a narrower width, whereby the monitor screen unit 2 cannot be revolved in the-direction reverse to that indicated by the arrow A.

However, the conventional shaft rotator which has the configuration described above poses a problem that it hinders video cameras from being configured compact since the shaft rotator requires rotation control mechanisms such as the rotation control piece 16, the first rotation control plate 17 and the second rotation control plate 18 which are accommodated in the casing of the VTR unit, thereby requiring a large space.

The present invention has an object to solve the conventional problems described above and to provide a shaft rotator which is configured to hinder two shafts of a shaft rotator accommodated in a recorder/reproducer unit from rotating at a time and is effective to configure video cameras compact since an internal space of a console of a VTR unit needs not be used.

DISCLOSURE OF THE INVENTION

In order to accomplish the object, the shaft rotator according to the present invention is configured to comprise the first and second shafts which intersect perpendicularly with each other as well as a holding member which rotatably holds the first and second shafts, and have a structure wherein cavities are formed in intersecting portions of the first and second shafts, and the cavity formed in the first shaft is engaged with the cavity formed in the second shaft or a diametrical portion thereof.

This configuration makes it possible to obtain a shaft rotator which uses no space in a first casing which accommodates VTR unit and permits configuring a video camera compact.

A shaft rotator according to the present invention comprises first and second shafts which intersect with each other as well as a holding member which rotatably holds the first and second shafts, and has a structure wherein cavities are formed in intersecting portions of the first and second shafts and the cavity formed in the first shaft is engaged with the cavity formed in the second shaft or a diametrical portion thereof, thereby having a function not to allow these two shafts to rotate at the time.

A shaft rotator according to another invention is a shaft rotator which is disposed between a first casing comprising a recorder/reproducer unit and a second casing comprising a monitor screen unit, and comprises a first shaft which is fixed to the first casing, a second shaft which is fixed to the second casing and a holding member which rotatably holds the first and second shafts, whereby the second casing has a function not to allow both the casings to rotate at a time around the two shafts.

A shaft rotator according to still another invention comprises a first shaft which is located farther from a first casing than a second shaft when the first casing is in parallel with a second casing, thereby having a function to allow the shaft rotator and the second casing more compact as compared with a case where the shafts are disposed in reverse relationship.

DESCRIPTION OF THE EMBODIMENT

Figure 1:
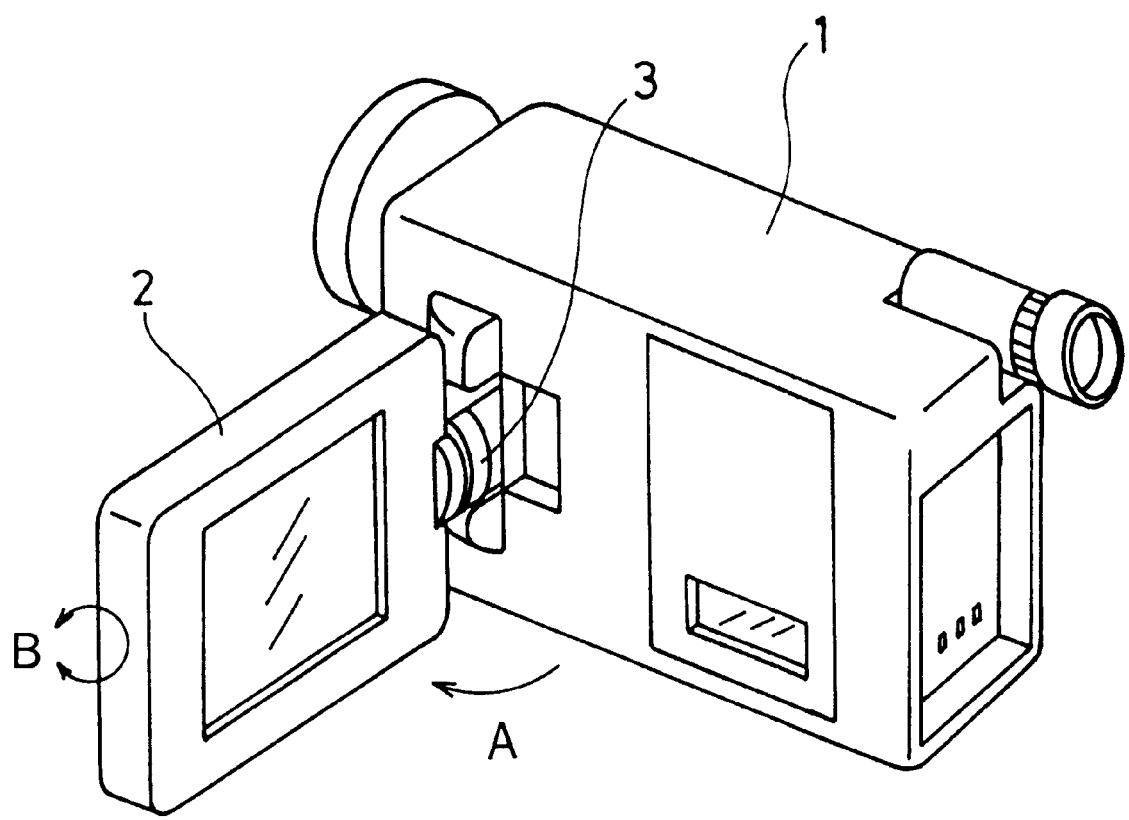
FIG. 1 is a perspective view illustrating a configuration of a recorder/reproducer unit using a shaft rotator preferred as an embodiment of the present invention.

FIG. 1 is a perspective view illustrating a configuration of a recorder/reproducer unit which uses a shaft rotator preferred as the embodiment of the present invention, wherein a reference numeral 1 represents a recorder/reproducer unit which can accommodate a tape cassette, and comprises a mechanism and a circuit capable of recording and reproducing video and voice signals on and from the tape cassette, a reference numeral 2 designates a monitor screen unit which is rotatably attached to the recorder/reproducer unit 1 and has a monitor screen on one side, and a reference numeral 3 denotes a shaft rotator section which holds the monitor screen unit 2 revolvably and rotatably to the recorder/reproducer unit 1.

Figure 2:
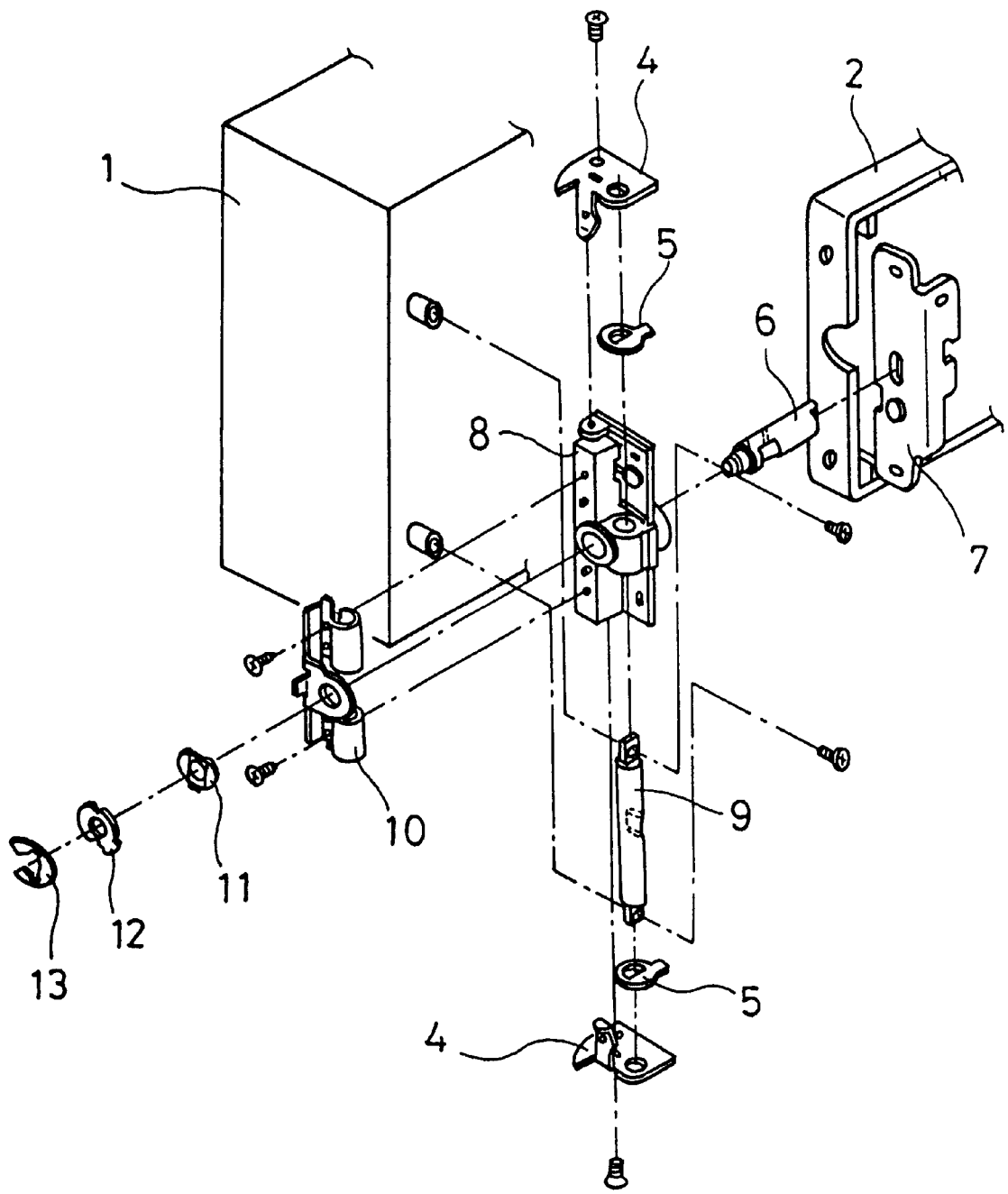
FIG. 2 is an exploded perspective view illustrating an internal configuration of a shaft rotator section of the embodiment.

FIG. 2 is a perspective view illustrating an internal configuration of the shaft rotator section 3 in a disassembled condition. In FIG. 2, a reference numeral 4 represents a side plate which is fixed to a holding member 8 with a screw, a reference numeral 5 designates an open/close restricting plate which has an oval hole, and a reference numeral 6 denotes a rotating shaft which is disposed on the monitor screen unit 2 as a first shaft, passes through the holding member 8 and an open/close load member 10, and has a tip having a section in a D-like shape. A reference numeral 7 represents a fixed plate which is fixed to the monitor screen unit 2 and to which the rotating shaft 6 is fixed by caulking. A reference numeral 8 designates the holding member which rotatably holds the rotating shaft 6 and an open/close shaft 9, and a reference numeral 9 denotes the open/close shaft which is a second shaft fixed to the recorder/reproducer unit 1 with a screw, passes through the holding member 8 and a carting portion of the open/close load member 10, and is forcibly fitted into the carling portion so as to produce a torque for rotating the holding member 8. Further, the ends of the open/close shaft 9 have an oval section, over which the open/close restricting plate 5 is forcibly fitted, and the side plate 4 is fitted over this open/close restricting plate 5 from outside and fixed to the holding member 8 with a screw. A reference numeral 10 represents the open/close load member which is fixed to the holding member 8 with screws, a reference numeral 11 designates a wave washer-like rotation load member through which a tip of the rotating shaft 6 passes, a reference numeral 12 denotes a rotation restricting plate through which the tip of the rotating shaft 6 passes and which has an outer circumferential cavity engaged with a claw of the rotation load member 11, and a reference numeral 13 represents an E ring which is engaged with a groove formed in the tip of the rotating shaft 6. The rotation load member 11 is pressed to the open/close load member 10 to produce a torque for rotating the rotating shaft 6.

Figure 3:
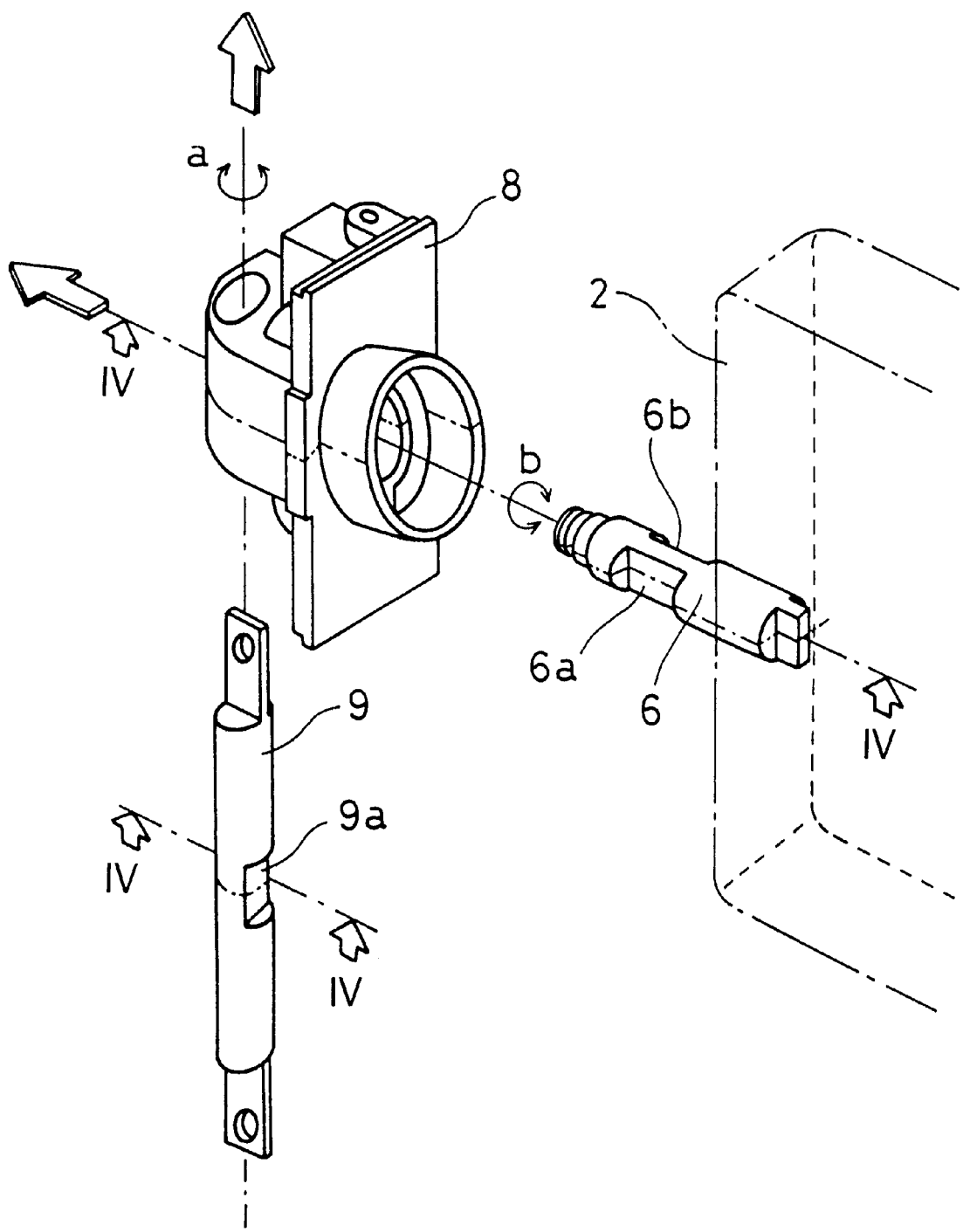
FIG. 3 is an exploded perspective view illustrating a configuration of main members of the embodiment.

FIG. 3 is an exploded perspective view illustrating a configuration of the main members shown in FIG. 2. In FIG. 3, reference numerals 6a and 6b represent first and second cavities which are formed to oppose to each other in a middle portion of the rotating shaft 6, and a reference numeral 9a designates an open/close cavity formed in a middle portion of the open/close shaft 9.

FIGS. 4a, 4b, 5a and 5b are sectional views taken along an axial line of the rotating shaft 6 in a direction indicated by an arrow IV for illustrating various conditions of the monitor screen unit 2 relative to the recorder/reproducer 1 in a condition where the rotating shaft 6 and the open/close shaft 9 shown in FIG. 3 are inserted into the holding member 8. In a condition shown in FIG. 4a, the monitor screen unit 2 is set in parallel with the recorder/reproducer 1 and the cavity 6a of the rotating shaft 6 is engaged with the outer circumferential portion of the open/close shaft 9, whereby the monitor screen unit 2 cannot rotate in the direction indicated by the arrow B. Though the monitor screen of the monitor screen unit 2 faces the recorder/reproducer 1 in FIG. 4a, the cavity 6b of the rotating shaft similarly engages with the arc portion on the outer circumference of the open/close shaft 9 and the monitor screen unit is not rotatable in the direction indicated by the arrow B when the monitor screen of the monitor screen unit 2 faces the opposite side.

Figure 4A:
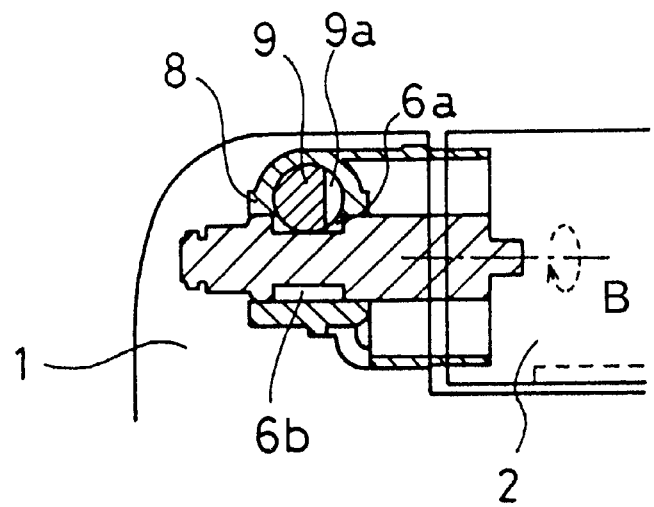
FIGS. 4a and 4b are exploded perspective views illustrating a configuration of the main members of the embodiment.
Figure 4B:
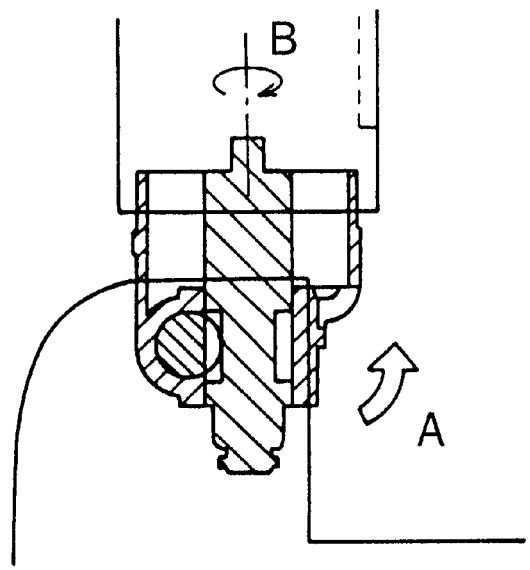

FIG. 4b shows a condition where the monitor screen unit 2 is rotated approximately 90° from the position shown in FIG. 4a around the open/close shaft 9 in the direction indicated by the arrow A and the cavity 6a on the outer circumference of the rotating shaft 6 is opposed to the cavity 9a on the outer circumference of the open/close shaft 9, whereby the monitor screen unit 2 is freely rotatable in the direction indicated by the arrow B.

Figure 5A:
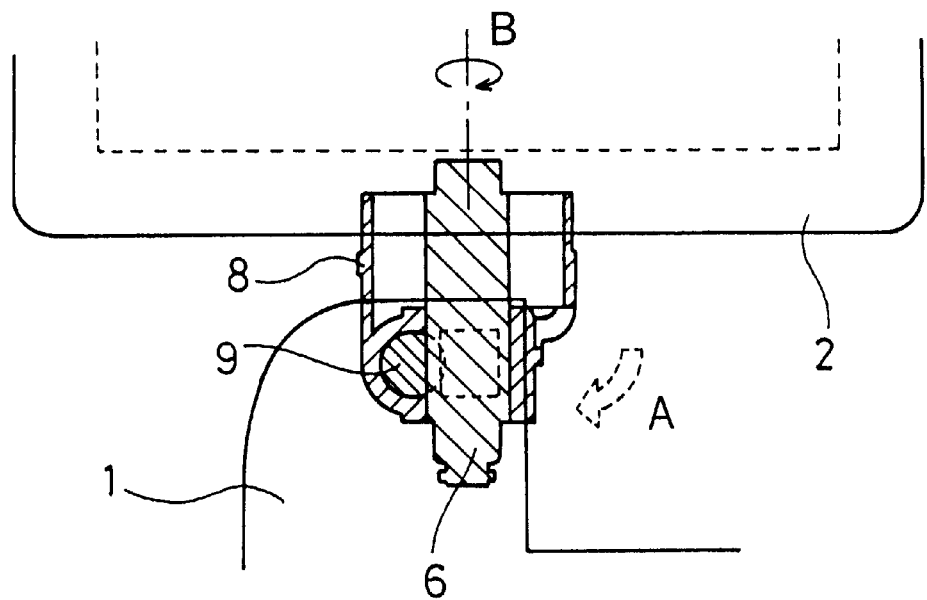
FIGS. 5a and 5b are exploded perspective views illustrating a configuration of the main members of the embodiment.
Figure 5B:
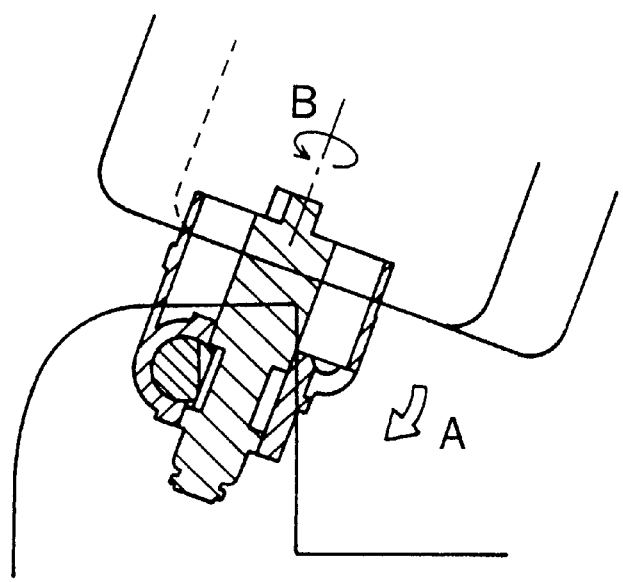
Figure 6A:
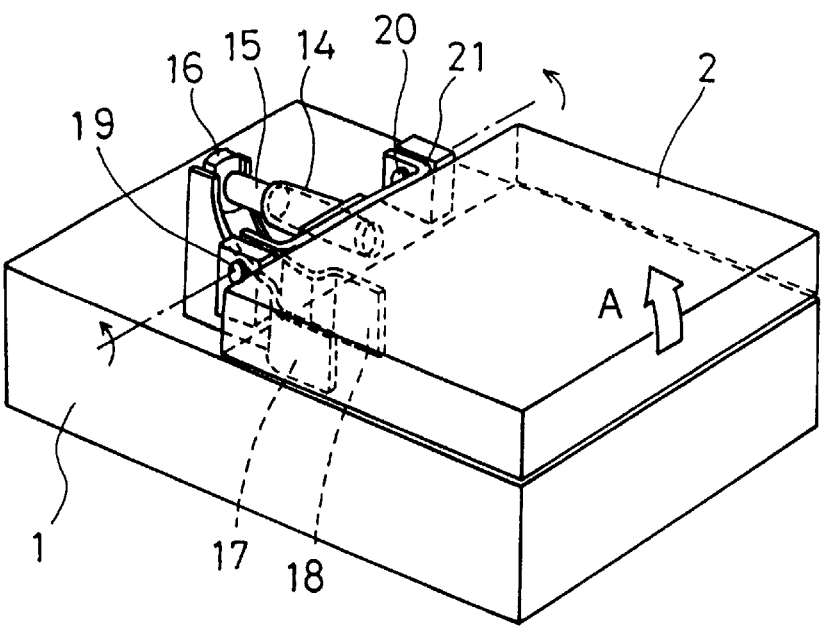
FIGS. 6a and 6b are perspective views illustrating a rotating shaft control mechanism of a conventional shaft rotator.
Figure 6B:
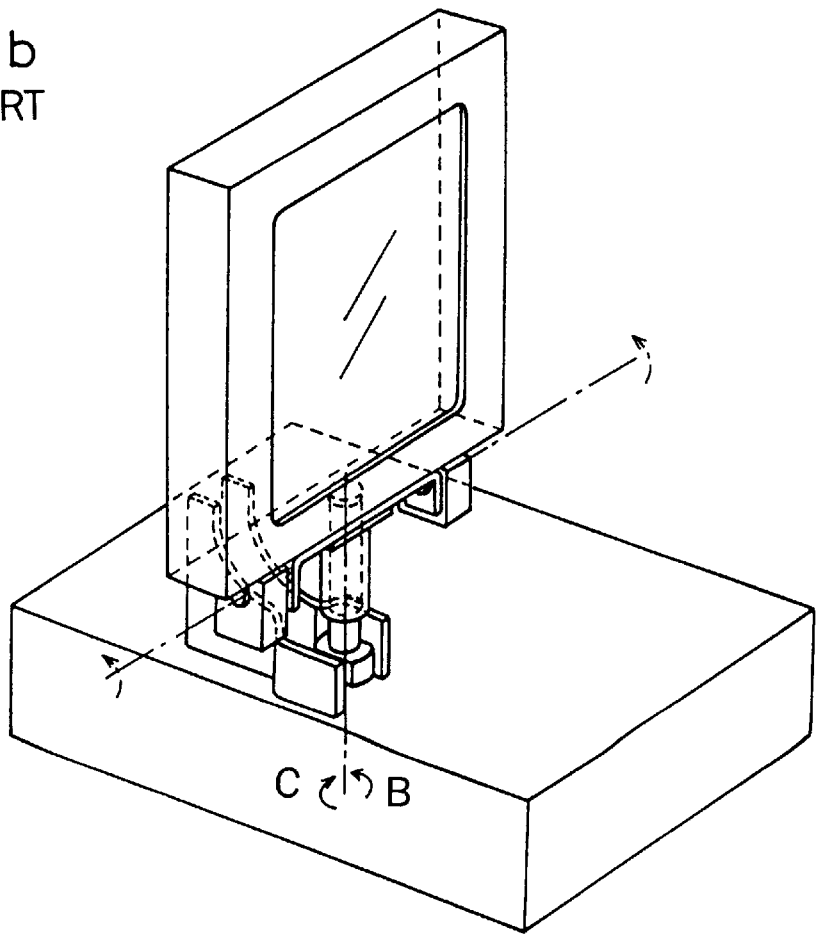
Figure 7:
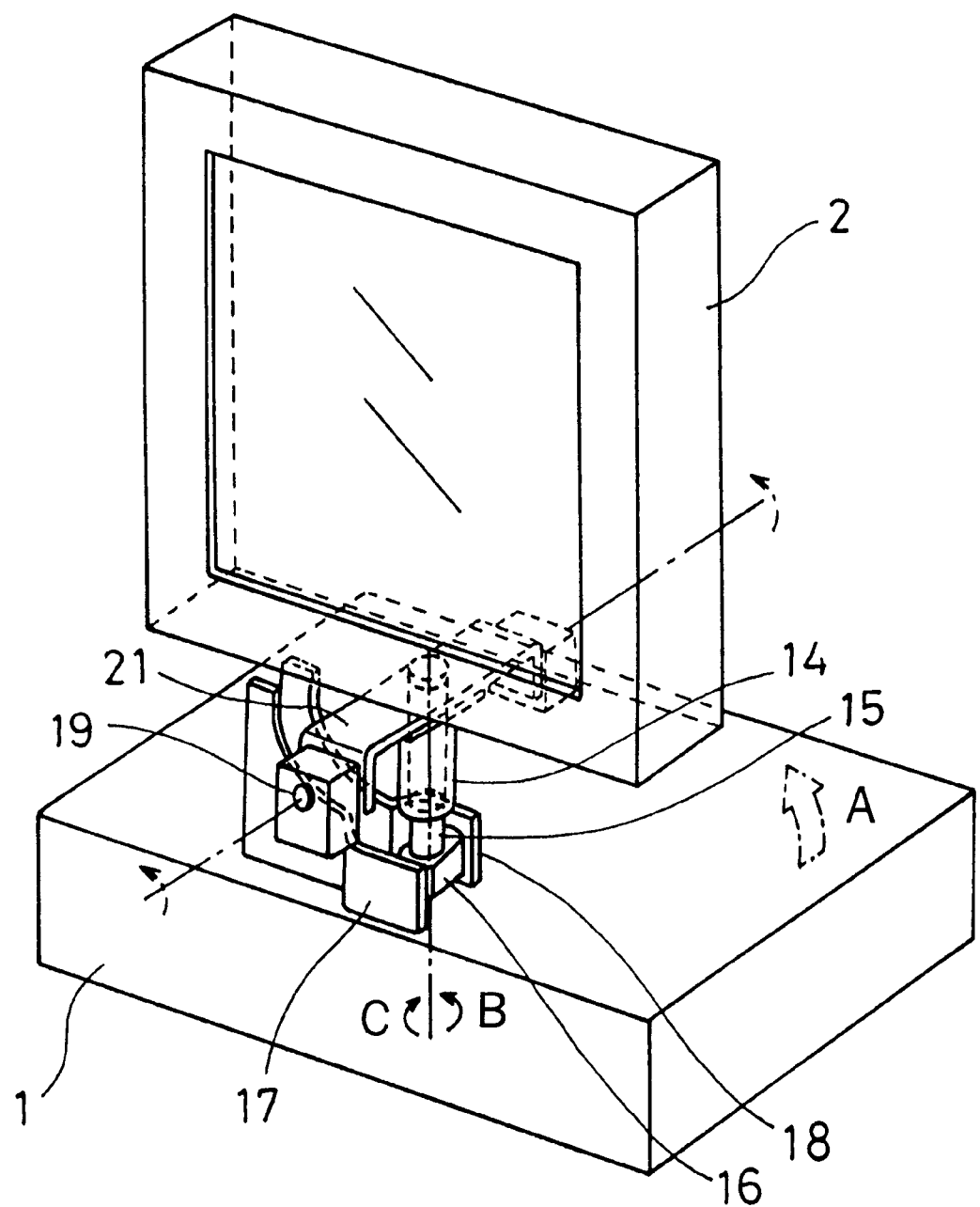
FIG. 7 is a perspective view illustrating the rotating shaft control mechanism of the conventional shaft rotator.

FIG. 5a shows a condition where the monitor screen unit 2 is rotated approximately 90° from the position shown in FIG. 4b around the rotating shaft 6 in the direction indicated by the arrow B and the arc portion on the outer circumference of the rotating shaft 6 engages with the cavity 9a on the outer circumference of the open/close shaft 9, whereby the monitor screen unit 2 is not rotatable in the direction indicated by the arrow A to prevent an angle of the monitor screen unit 2 from being brought into contact with the recorder/reproducer unit 1. To reset the monitor screen unit 2 in the condition shown in FIG. 5a to be in the condition shown in FIG. 4a, it is necessary to return the monitor screen unit 2 to the position shown in FIG. 4b once, by rotating it around the rotating shaft 6. When the monitor screen unit 2 is rotated around the open/close shaft 9 in the direction indicated by the arrow A without returning it completely to the condition shown in FIG. 4b, thereby leaving a deviation at an optional angle as shown in FIG. 5b, the angle formed by the arc portion on the outer circumference of the rotating shaft 6 and the cavity 6a formed in the rotating shaft 6 is brought into contact with the angle formed by the arc portion on the outer circumference of the open/close shaft 9 and the cavity 9a formed in the open/close shaft 9, and when the monitor screen unit 2 is further rotated in the direction indicated by the arrow A, the rotating shaft 6 is forcibly rotated in the direction indicated by the arrow B, whereby the monitor screen unit 2 is similarly rotated and can be reset to be in the condition shown in FIG. 4a without bringing its angle into contact with the recorder/reproducer unit 1.

Further, the monitor screen which is described with reference to FIG. 4a can be set on a side opposite to the recorder/reproducer unit 1 by turning the monitor screen unit 2 approximately 180° around the rotating shaft 6 in the condition shown in FIG. 4b, thereby resetting the monitor screen unit to be in the condition shown in FIG. 4a.

Furthermore, the monitor screen unit 2 can be moved in various modes by optionally combining the positional angles, shapes, quantities of the cavities 9a formed in the open/close shaft 9 as well as those of the cavities 6a and 6b formed in the rotating shaft 6.

As understood from the foregoing description, the present invention makes it possible to revolve and rotate a monitor screen unit without bringing it into contact with a recorder/reproducer unit and to prevent an internal space of the recorder/reproducer unit from being occupied by component members of a shaft rotator, thereby providing excellent effects to configure a compact recorder/reproducer which uses the shaft rotator of the present invention.

Though description has been made of a hinge portion of a video camera in the embodiment explained above, it is needless to say that the present invention is not limited to the hinge portion, but is the shaft rotator widely applicable within a scope defined in claims.

What is claimed is:

1. A shaft rotator comprising:

first and second shafts which perpendicularly intersect with each other; and a holding member which rotatably holds said first and second shafts, wherein cavities are formed in intersecting portions of said first and second shafts respectively, and the cavity formed in said first shaft engages with the cavity formed in said second shaft or a diametrical portion thereof.

2. A shaft rotator according to claim 1 further comprising:

a plurality of cavities formed in at least one of the shafts.

3. A shaft rotator according to claim 1, wherein said second shaft is freely rotatable when the second shaft engages with the cavity formed in the first shaft, said first shaft is freely rotatable when said first shaft engages with the cavity formed in said second shaft, said second shaft is not revolvable when said first shaft is freely revolvable and said first shaft is not revolvable when said second shaft is freely revolvable.

4. A shaft rotator disposed between a first casing and a second casing of a recorder/reproducer system having a first casing containing a recorder/reproducer unit and a second casing containing a monitor screen unit, wherein the shaft rotator comprises a first shaft which is fixed to said first casing, a second shaft which is fixed to said second casing, and a holding member which rotatably holds said first shaft and said second shaft.

5. A shaft rotator according to claim 4, wherein the first shaft is located farther from said first casing than the second shaft when the first casing and the second casing are parallel with each other.

6. A shaft rotator according to claim 4, wherein said second casing is not rotatable around the shaft fixed to said second casing while it is revolving from a position parallel with said first casing to an optional angle in a vertical direction around the shaft fixed on the first casing, and said second casing is located at said optional angle relative to said first casing and is not rotatable around the shaft fixed to said first casing from said optional angle in a parallel direction while it is rotating at a certain angle around the shaft fixed to said second casing.

* * * * *